United States Patent [19]
Krysel et al.

[11] Patent Number: 5,139,175
[45] Date of Patent: Aug. 18, 1992

[54] AIR DISTRIBUTING DEVICE

[75] Inventors: Fred C. Krysel, Lakeshore, Minn.; Lonnie R. Jeffers, Fort Worth, Tex.

[73] Assignee: Cargo Tank Engineering, Inc., Lakeshore, Minn.

[21] Appl. No.: 739,523

[22] Filed: Aug. 2, 1991

[51] Int. Cl.[5] .................. B65G 69/06; B67D 5/06
[52] U.S. Cl. .................... 222/195; 137/860; 239/533.13; 406/137; 366/101; 366/107
[58] Field of Search ............ 222/195; 137/860; 239/533.13; 406/137; 366/101, 107

[56] References Cited

U.S. PATENT DOCUMENTS

| | | | |
|---|---|---|---|
| 3,929,261 | 12/1975 | Solimar | 222/195 |
| 3,952,956 | 4/1976 | Steele | 222/195 X |
| 4,015,622 | 4/1977 | Pagani | 137/523 X |
| 4,030,755 | 6/1977 | Heimke | 222/195 X |
| 4,172,539 | 10/1979 | Botkin | 222/195 |
| 4,556,173 | 12/1985 | Pausch et al. | 222/195 X |
| 4,662,543 | 5/1987 | Solimar | 406/137 X |
| 4,739,964 | 4/1988 | Hutt | 222/195 X |
| 4,820,052 | 4/1989 | Krysel | 406/137 X |

FOREIGN PATENT DOCUMENTS 1909219 3/1978 Fed. Rep. of Germany ...... 222/195

*Primary Examiner*—Kevin P. Shaver
*Assistant Examiner*—Kenneth DeRosa
*Attorney, Agent, or Firm*—Leo Gregory

[57] ABSTRACT

An air distributing device mounted into the sloping wall of a hopper containing finely divided material, such as flour or cement, aerating and causing the discharge of the material with a pressurized air flow and keeping the material in constant motion toward the discharge outlet of the hopper, the air distributing device being substantially hemi-spherical in form and providing a wide distribution of the pressurized air.

4 Claims, 3 Drawing Sheets

AIR DISTRIBUTING DEVICE

BACKGROUND OF THE INVENTION

1. Field of Invention

This invention relates to a distributing device to assist in unloading by aeration finely divided bulk material such as cement from a container such as a hopper, a tank truck, a rail car or the like.

2. Brief Description of the Prior Art

Various devices are known to be used for the purpose indicated as is disclosed in the patent reference material provided in connection herewith.

It has been found that the prior art devices do not appear to have a sufficiently wide distribution of pressurized air to effectively move the material in the container outwardly through a discharge outlet. It is important to have a sufficient pressurized movement of air to aerate the material to prevent bridging and to keep it under constant movement until discharged. Further it is necessary to have an equalized pressurized air stream bearing against the body of material to be discharged.

SUMMARY OF THE INVENTION

The present device of the invention herein has a unique form which contributes to the development of a widespread effective air stream which engages the material to be moved.

It has been found that the hemi-spherical form of the air distributing head herein contributes to a wider more effective distribution of an air stream than has previously been the case.

DESCRIPTION OF A PREFERRED EMBODIMENT

Figure 3:
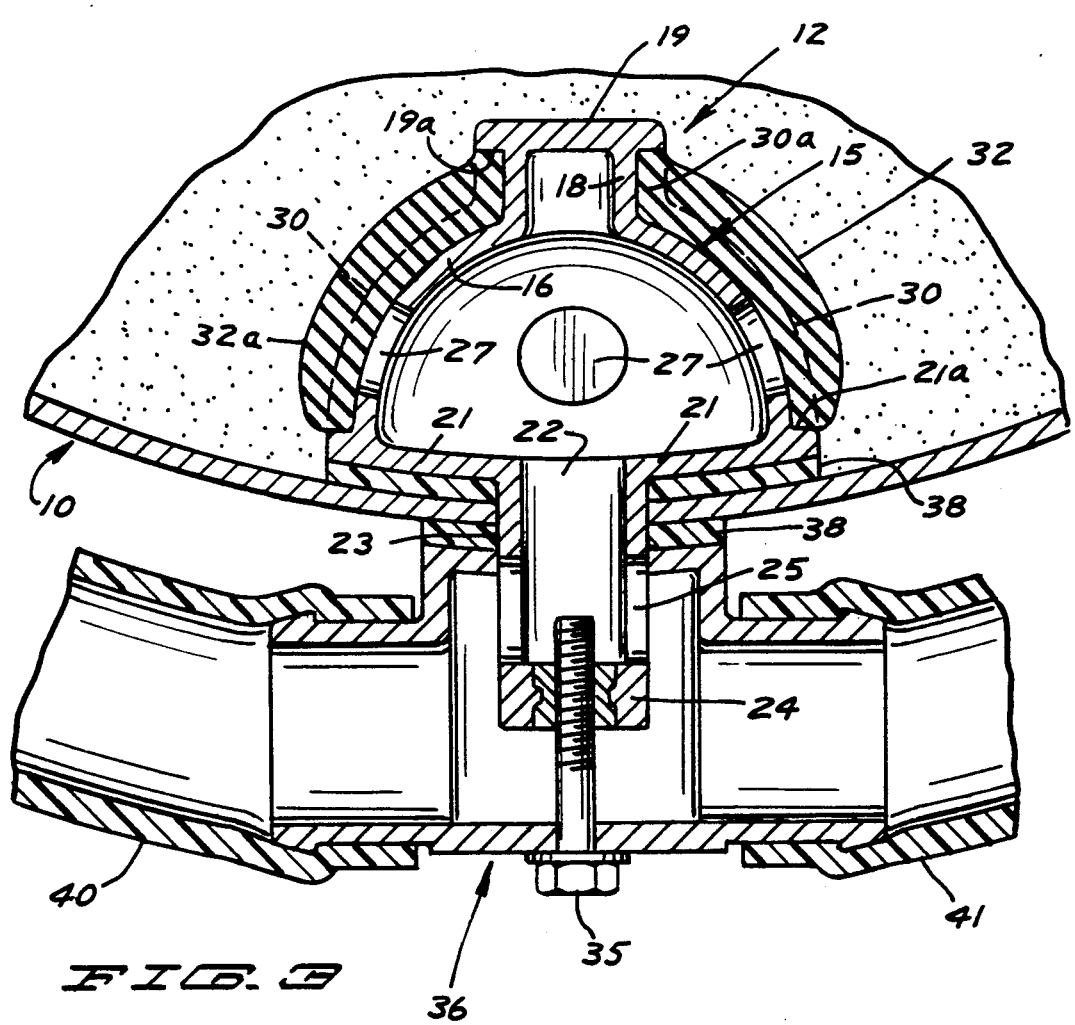
FIG. 3 is a broken view in vertical section taken on line 3—3 of FIG. 1 as indicated.

Referring to the drawings and more particularly to FIG. 3, the reference numeral 11 indicates the outer wall of a conventional hopper 10 with the air distributing device 12 herein being shown in an operating position.

Figure 1:
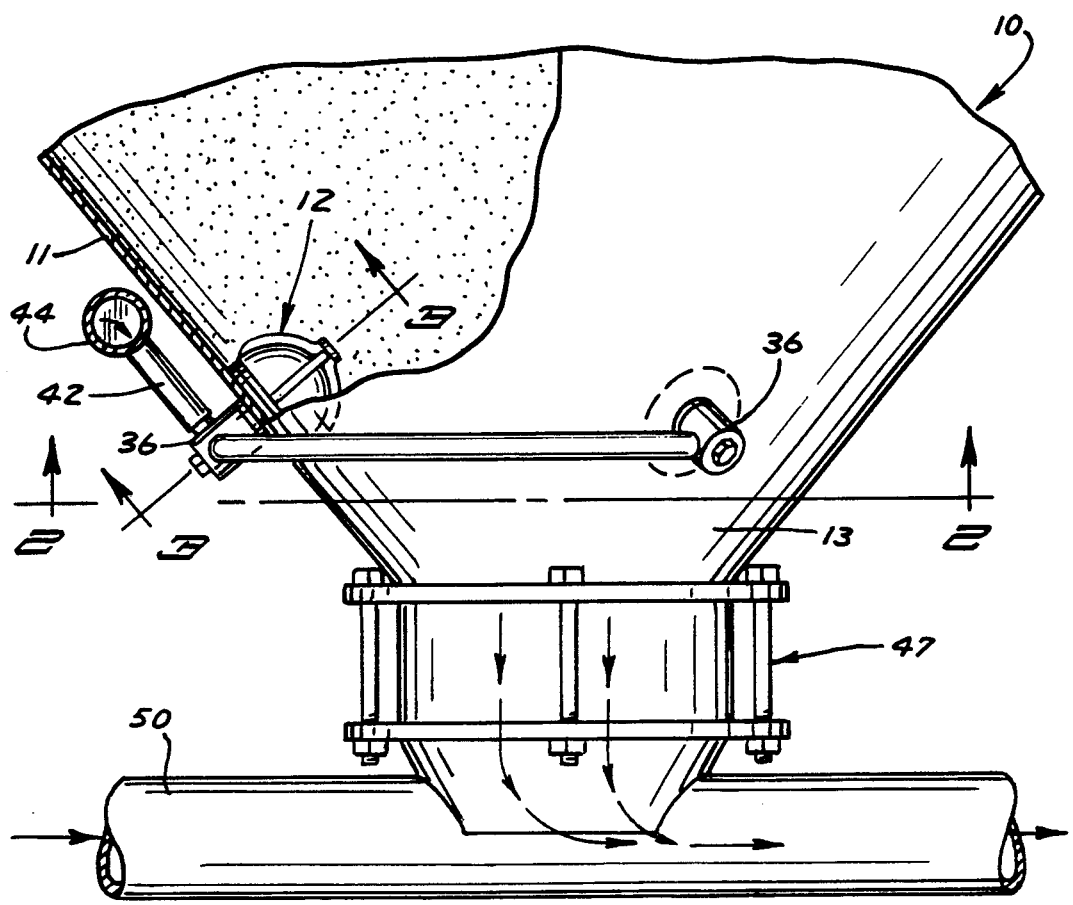
FIG. 1 is a broken view in elevation of a hopper with a portion broken away showing the device herein in an operating position.

As shown in FIG. 1, the device is located near the discharge outlet 13 of said hopper and a number of the devices 12 will be positioned in the lower wall portion of said hopper about said outlet. The device here shown and described is a representative device.

Referring again to FIG. 3, the device herein comprises an inner body 15 which is hemi-spherical in form and is made out of a suitable material to become a rigid casting having a wall 16 encompassing a chamber 17. The upper central portion of said wall projects upwardly neck-like cylindrically as at 18 having a top wall 19 which has an annular flange 19a thereabout.

Said casting or body 15 has a bottom wall 21 having a central air inlet or passage 22 within a depending cylindrical hollow stem 23 which extends outwardly of said wall. Said stem has a bottom wall 24 and side wall air vents 25.

Said bottom wall 21 has an annular flange 21a thereabout.

Said casting has a plurality of air outlets 27 in the side wall 16 thereof.

Said casting 15 in being regarded as an inner body has fitting snugly thereover and thereabout a resilient, flexible, expandable skirt member 30. Said skirt has a somewhat thickened neck portion 30a about said upward projection 18 and abuts said flange 19a. Said skirt fits said casting very snugly and extends downwardly to engage the flange 21a about which more will be described.

Said skirt is provided with a plurality of overlying ribs 32 which are tapered somewhat downwardly as at 32a and said ribs are designed to modify or control the expansion of said skirt permitting its principal expansion about its bottom.

The casting 15 is secured to the wall 11 by an anchor bolt 35 which extends through an air nipple 36, said bolt being threaded into said bottom wall 24 of said stem 23. Said wall 24 will be tapped to receive said bolt. Appropriate gaskets 38 will be inserted as illustrated between said wall of said hopper and said nipple and between said wall of said hopper and the bottom wall of said device to provide an airtight seal.

Figure 2:
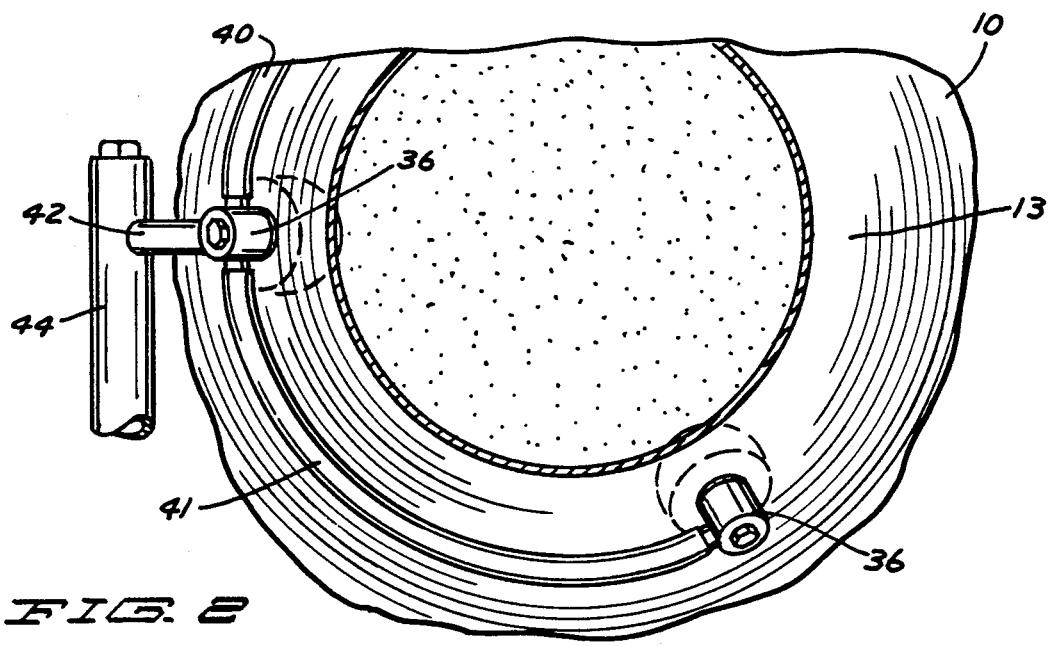
FIG. 2 is a view in horizontal section taken on line 2—2 of FIG. 1 as indicated.
Figure 4:
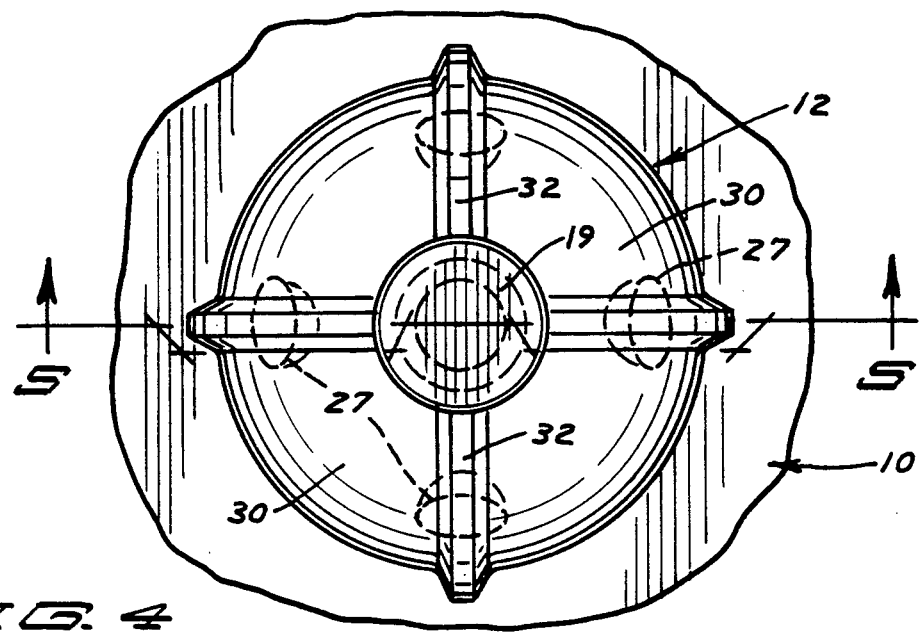
FIG. 4 is a top plan view of the device herein.

Said nipple 36 is of conventional design having a pair of air hose attachments 40 and 41 interconnecting said devices 12 as indicated in FIG. 2. One of said nipples 36 will have a line 42 running to a supply 44 which runs to a common source of pressurized air which supplies all of said devices through the interconnecting lines 40 and 41. The line diameters of the supply line and interconnecting lines will be designed to provide a uniformily pressurized air supply to all of said air distributing devices.

Referring to FIG. 1, at the bottom of said hopper adjacent the discharge outlet 13 there is a collar assembly 47 which is conventional and which is adapted to have secured thereto a discharge or conveying line 50 which will convey the material discharged from the hopper to a desired site or receptacle.

Figure 5:
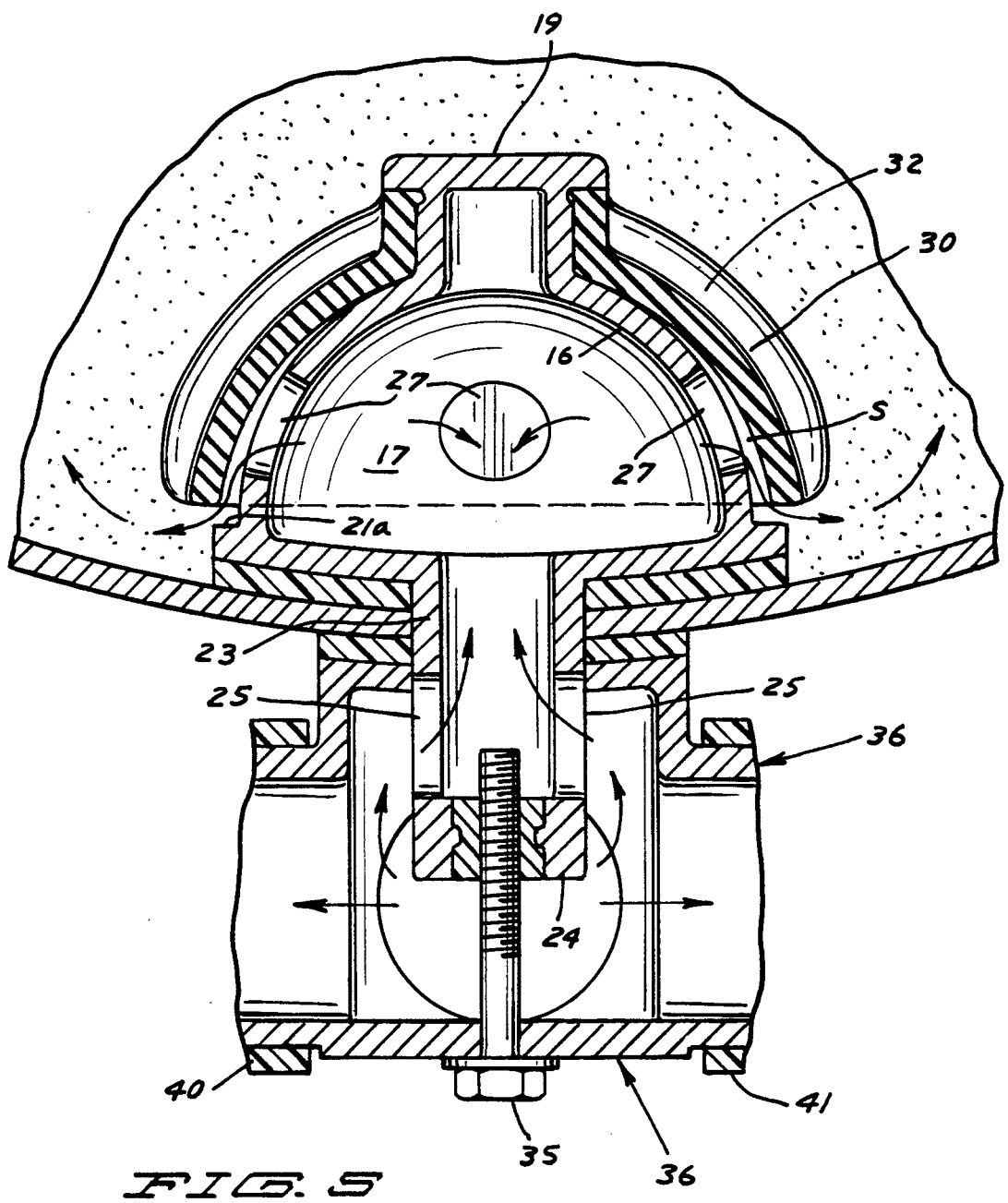
FIG. 5 is a view in vertical section taken on line 5—5 of FIG. 4 as indicated.

Referring now to FIG. 5, to describe a cycle of operation, adequate pressurized air is supplied through the general supply line 44 and interconnecting lines 41 and 42 through (FIG. 2) the nipple 36 and through interconnecting lines supplying all of the air distributing devices 12.

The incoming air supply builds up pressure within the chamber 17 until air pressure is sufficient to cause said skirt to yield and expand and become deflected circumferentially of said wall 16 and thus creates the spacing S through which the incoming air flows with significant pressure. In passing through said space S, said air is deflected outwardly horizontally by the flange 21a and engages, aerates and causes movement of the material within said hopper downstream of the outlet. Said air is sufficiently pressurized to prevent the presence of cavitation or bridging but instead causes a smooth flow of the powdery or pulverized like material within said hopper. It is noted in FIG. 5, that as said skirt expands, its lower edge portion swings upwardly away from the flange 21a to provide a directive passage to guide the outgoing stream of air.

It is noted that importance is attached to the particular shape of said casting 15. In being hemi-spherical, there is an excellent uniform discharge or outflowing of the pressurized air stream and it has been found to be extremely effective in engaging and moving the material in the hopper. Thus there appears to be present a substantially improved performance over the previous U.S. Pat. No. 4,820,052 issued to the inventor herein.

It will of course be understood that various changes may be made in the form, details, arrangement and proportions of the product without departing from the scope of the invention which, generally stated, consists in a product capable of carrying out the objects above set forth, in the parts and combination of parts disclosed and defined in the appended claims.

What is claimed is:

1. An air distributing head to aerate and cause the discharge movement of finely divided material within a hopper to its outlet, comprising
    a rigid hemi-spherical body having a chamber therein and having air holes therethrough,
    a resilient expandable skirt overlying said body,
    means securing said skirt at the upper portion of said body,
    means modifying expansion of said skirt,
    said body having a bottom wall having an annular flange thereabout, said skirt engaging said flange,
    means supplying pressurized air to said chamber,
    said skirt expanding responsive to pressurized air through said air holes and lifting away from said bottom wall flange providing an air passage therebetween,
    said flange deflecting said air through said air passage aerating the adjacent material in said hopper causing its movement toward said outlet.

2. The structure of claim 1, whereby
    a plurality of said air distributing heads are disposed about said outlet of said hopper.

3. An air distributing head to aerate and cause the discharge movement of finely divided material within a hopper to the outlet thereof, comprising
    a rigid hemi-spherical body having a chamber therein and having air holes therethrough,
    a resilient expandible skirt overlying said body,
    said body having an upward neck projection,
    said skirt having an upper portion secure about said upward projection,
    said body having a bottom wall having an air passage therethrough,
    an annular flange about said bottom wall,
    said skirt having a bottom engaging said flange,
    said skirt expanding responsive to pressurized air through said air holes and lifting away from said body,
    said flange deflecting the air expanding said skirt causing a substantial horizontal distribution of said air whereby,
    said pressurized air aerates the adjacent material in said hopper and causes the discharge movement thereof to said outlet.

4. An air distributing head to aerate and cause the movement of finely divided material downstream within a hopper toward a discharge outlet, comprising,
    a rigid hemi-spherical body having a chamber therein and having air holes therethrough,
    a resilient expandable skirt overlying said body,
    means securing said skirt at the upper portion of said body,
    said body having a bottom wall, an annular flange about said bottom wall,
    means supplying pressurized air to said chamber of said body,
    said skirt expanding responsive to pressurized air through said air holes,
    said skirt having a bottom edge portion engaging said flange,
    a plurality of radial ribs overlying said skirt modifying the expansion thereof,
    said skirt upon expanding lifting said bottom edge away from said flange forming an air passage therebetween,
    said flange deflecting horizontally pressurized air passing through said air passage aerating the material in said hopper and causing its movement toward said discharge outlet.

* * * * *